United States Patent
Andersson et al.

(10) Patent No.: US 9,068,614 B2
(45) Date of Patent: Jun. 30, 2015

(54) ARRANGEMENT FOR SUPPLYING OIL TO A BRAKE

(75) Inventors: Thomas Andersson, Eskilstuna (SE); Mats Akerblom, Eskilstuna (ES)

(73) Assignee: Volvo Construction Equipment AB, Eskilstuna (SE)

( * ) Notice: Subject to any disclaimer, the term of this patent is extended or adjusted under 35 U.S.C. 154(b) by 0 days.

(21) Appl. No.: 13/983,316

(22) PCT Filed: Feb. 3, 2011

(86) PCT No.: PCT/SE2011/000018
§ 371 (c)(1),
(2), (4) Date: Aug. 14, 2013

(87) PCT Pub. No.: WO2012/105874
PCT Pub. Date: Aug. 9, 2012

(65) Prior Publication Data
US 2013/0313053 A1    Nov. 28, 2013

(51) Int. Cl.
| F16D 65/853 | (2006.01) |
| E02F 9/20 | (2006.01) |
| B60K 17/04 | (2006.01) |
| B60T 17/02 | (2006.01) |
| F16H 57/04 | (2010.01) |
| F16D 55/36 | (2006.01) |

(52) U.S. Cl.
CPC ............ *F16D 65/853* (2013.01); *E02F 9/2083* (2013.01); *B60K 17/046* (2013.01); *B60T 17/02* (2013.01); *F16H 57/0473* (2013.01); *F16H 57/0486* (2013.01); *F16D 55/36* (2013.01); *B60Y 2200/411* (2013.01)

(58) Field of Classification Search
None
See application file for complete search history.

(56) References Cited

U.S. PATENT DOCUMENTS

| 3,912,060 A | * | 10/1975 | Handke .................... 192/113.34 |
| 4,046,235 A | | 9/1977 | Shutt |
| 4,140,198 A | | 2/1979 | Chamberlain |
| 4,488,626 A | * | 12/1984 | Handke ....................... 192/70.12 |
| 4,491,202 A | | 1/1985 | Schmitt |
| 4,646,880 A | | 3/1987 | Logan |
| 4,655,326 A | | 4/1987 | Osenbaugh |
| 4,736,821 A | | 4/1988 | Ries |
| 4,883,149 A | * | 11/1989 | Campbell et al. ......... 188/264 E |

(Continued)

FOREIGN PATENT DOCUMENTS

| KR | 100292797 B1 | 3/2001 |
| WO | 03040581 A1 | 1/2003 |
| WO | 2007004937 A1 | 1/2007 |

OTHER PUBLICATIONS

English translation of JP 55107132 A by Yutaka Hirai.*

(Continued)

*Primary Examiner* — Robert Hodge
*Assistant Examiner* — Alberto Interian, III
(74) *Attorney, Agent, or Firm* — WRB-IP LLP

(57) ABSTRACT

An arrangement is provided for supplying oil to a brake arranged for braking an output shaft of a planetary gear. The arrangement includes a rotatable impeller for supplying oil to the brake and the impeller is arranged to be rotated by an input shaft of the planetary gear.

16 Claims, 3 Drawing Sheets

A-A

(56) References Cited

U.S. PATENT DOCUMENTS

| | | | | |
|---|---|---|---|---|
| 5,197,929 A | * | 3/1993 | Scheiber et al. | 475/160 |
| 5,611,746 A | | 3/1997 | Shaffer | |
| 5,643,126 A | * | 7/1997 | Hotta et al. | 475/159 |
| 6,817,963 B1 | | 11/2004 | Solka | |
| 2003/0027680 A1 | * | 2/2003 | Wildeshaus | 475/159 |
| 2006/0037802 A1 | | 2/2006 | Mor | |

OTHER PUBLICATIONS

International Search Report (Oct. 5, 2011) for corresponding International application No. PCT/SE2011/000018.
International Preliminary Report on Patentabiliity (Mar. 7, 2012) for corresponding International application No. PCT/SE2011/000018.
JP55107132 (abstract and document) (Aug. 16, 1980) Akebono Brake Ind Co Ltd.

* cited by examiner

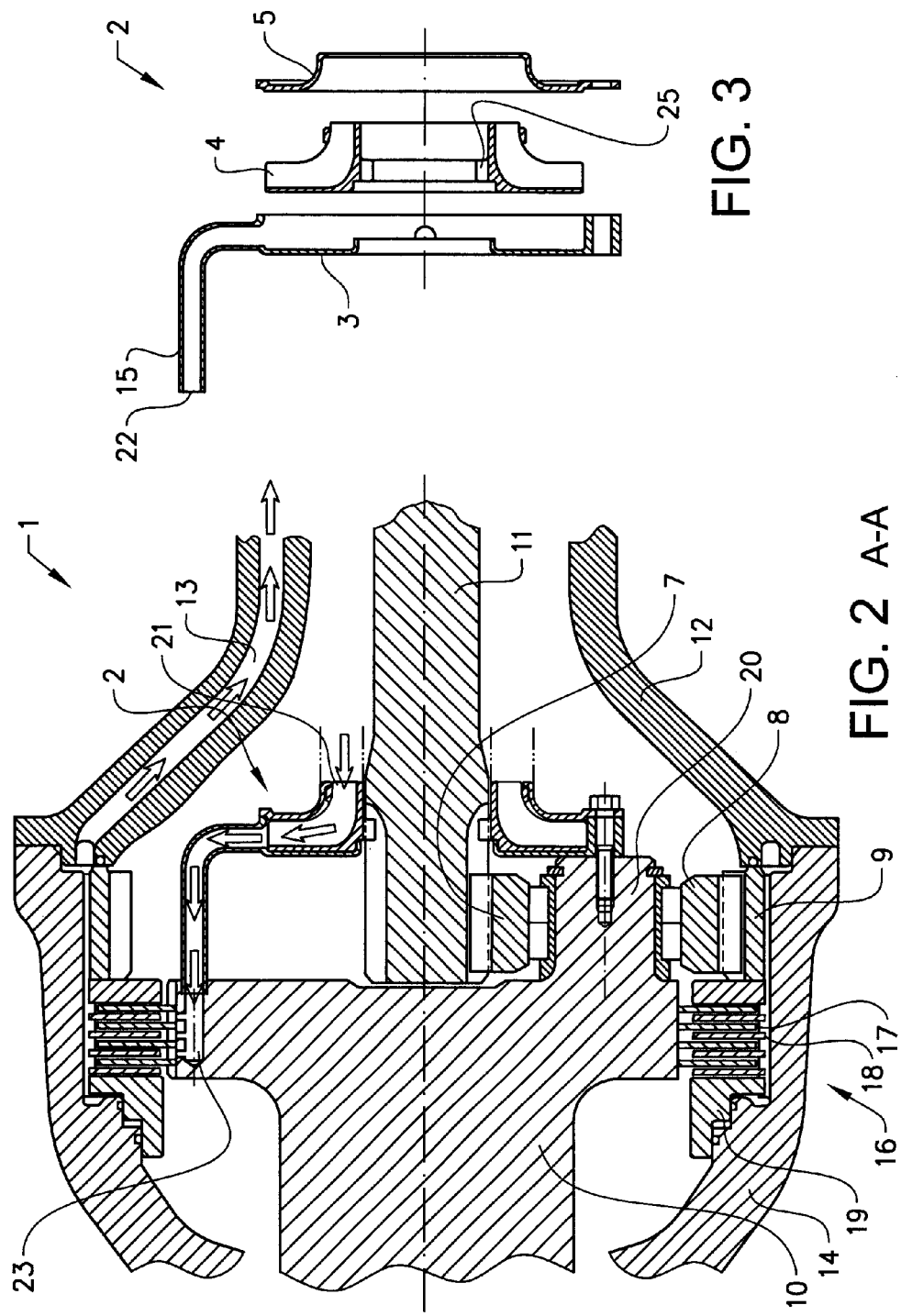

ARRANGEMENT FOR SUPPLYING OIL TO A BRAKE

BACKGROUND AND SUMMARY

The present invention relates, according to an aspect thereof, to an arrangement for supplying oil to a brake.

The invention, according to an aspect thereof, is applicable on working machines within the fields of industrial construction machines in particular wheel loaders. Although aspects of the invention will be described hereinafter with respect to a wheel loader, the invention is not restricted to this particular machine, but may also be used in other heavy working machines, such as articulated haulers, dump trucks, graders, excavators or other construction equipment.

Working machines, such as articulated haulers, wheel loaders, motor graders, excavators and other construction equipments are often equipped with wet disc brakes in order to provide a sufficient brake capacity and long service intervals. A wet disc brake uses a cooling liquid, usually some kind of oil or oil emulsion, to cool the brake discs in the disc brake. The cooling liquid is provided in a compartment where the brake is mounted, usually in the wheel hubs of the vehicle. The hub is filled with oil such that at least parts of the brake discs are submerged in the oil. The oil is thus in contact with the brake discs and the brake liners and is used to cool the brake, since oil has a better heat conductivity that air, especially in an enclosed brake arrangement.

In order to improve the brake capacity and to prevent brake fading, it is known to use an oil pump to actively supply the brake with oil instead of just letting the brake discs be immersed in the oil. An oil pump will improve the oil flow through the disc brake, which in turn will improve the cooling capacity of the oil. The oil will take up the heat from the brake and will distribute the heat to the larger part of the wheel hub where the brake is positioned. The cooling surface for the oil is thus enlarged. The brake capacity may be improved further by increasing the oil volume and/or the cooling of the oil. This can be done by using an external oil reservoir and/or an external oil cooler.

Such heavy vehicles are often provided with a hub reduction gear in order to improve the driving torque of the vehicle while at the same time reducing the stress put on the drive train and the differential of the vehicle. The hub reduction is normally a planetary gear which reduces the rotational speed from the incoming drive shaft and at the same time raises the driving torque with the same factor. The wet disc brake is mounted in the wheel hub. It is possible to mount the wet disc brake in two different positions in the wheel hub, either before or after the planetary gear.

If the wet disc brake is mounted before the planetary gear, it will rotate with the speed of the drive shaft which rotates with a relatively high rotational speed. The required brake torque is relatively low. The generated heat will heat the brake oil which must be cooled. If self-circulation is not enough, it is possible to use an external oil pump to increase the oil flow through the wet disc brake. Since the rotational speed of the drive shaft and thus of the brake discs is relatively high, it is possible to mount the oil pump with the brake discs in order to drive the oil pump. The high rotational speed of the oil pump will secure an oil flow through the wet disc brake.

A wet disc brake mounted after the planetary gear will rotate with the same speed as the wheel, which rotates with a relatively low rotational speed. The required brake torque will be relatively high. The generated heat will be approximately the same. If self-circulation is not enough to cool the brake oil, it is possible to use an external oil pump to increase the oil flow through the wet disc brake. Due to the low rotational speed of the wheel and thus of the brake, it is not possible to mount the oil pump with the brake since the oil flow from an oil pump rotating with such a low rotational speed will not be enough to pump a sufficient amount of oil through the wet disc brake. This is especially the case for centrifugal pumps that will not function properly at low rotational speeds. For a wet disc brake rotating with the wheel speed, it is thus necessary to use an external oil pump driven by an external power source, either a mechanical power outlet or an electric motor.

JP 55107132 A describes a reduction hub of a vehicle having a vane portion which functions as an oil pump for circulating oil through a wet disc brake. The created oil pump rotates with the same speed as the wheels of the vehicle.

The system described in JP 55107132 A and other known systems operate satisfactorily for some applications. There is however still room for improvements.

It is desirable to provide an improved oil supply arrangement for a brake in a vehicle. It is also desirable to provide an oil supply arrangement having an improved cooling capacity.

In an arrangement for supplying oil to a brake arranged for braking an output shaft of a planetary gear, where the arrangement comprises a rotatable impeller for supplying oil to the brake, the impeller is arranged to be rotated by an input shaft of the planetary gear.

By this first embodiment of the oil supply arrangement according, to an aspect of the invention, an oil pump that rotates with a high rotational speed and that can supply oil to a brake that rotates with a lower rotational speed is obtained. In this way, the impeller of the oil pump is mounted before the planetary gear such that it rotates with the speed of the input axle and the brake is mounted after the planetary gear such that it rotates with a lower speed. In this way, the oil pump can supply oil to the brake without the need of an external power source. This allows for a simple and cost-effective solution having few additional parts.

In an advantageous development of the inventive oil supply arrangement, the impeller is mounted on or to the sun gear of the planetary gear. In this way, the impeller will rotate with the speed of the input shaft which may be either a drive shaft for a wheel or a propeller shaft mounted before a differential. In either case, the impeller will rotate with a relatively high speed. Since the speed of the input shaft will be dependent on the travelling speed of the vehicle, the oil pump will be able to supply a substantial amount of oil when the vehicle is moving, i.e. when there is a need to cool the brake of the vehicle. The amount of supplied oil will also depend on the reduction ratio of the planetary reduction gear.

In a further advantageous development of the inventive oil supply arrangement, the oil pump comprises at least one oil conduit adapted to feed oil directly to the brake. In this way, the oil can be directed and distributed to parts of the brake where the cooling is most favourable. By including an oil distributor to the oil conduit, the oil can be distributed e.g. to separate brake discs and to separate brake linings of the brake. In this way, it is guaranteed that all brake discs are supplied with oil and that no brake disc is overheated due to an uneven oil distribution.

In a further advantageous development of the inventive oil supply arrangement, the brake is a wet disc brake. Disc brakes are well suited for the cooling with oil and can deliver a high and reliable brake torque. A wet disc brake is also well suited to be enclosed inside a wheel hub or a rear axle.

In a further advantageous development of the inventive oil supply arrangement, the arrangement is mounted in an axle casing having one or more oil channels for transporting the heated oil from the brake to a remote inner part of the axle. In this way, the axle casing can help to cool the oil due to a larger contact surface for the oil. Further, the cooling of the oil is aided due to the fact that the oil is distributed over a larger surface inside the axle. When the brake is mounted in the wheel hub of a vehicle, it is also possible to mix the oil of two adjacent wheel hubs, which may be of advantage if the brake on one side of the vehicle is used more than the other.

BRIEF DESCRIPTION OF DRAWINGS

The invention will be described in greater detail in the following, with reference to the attached drawings, in which FIG. 2 shows a cut side view of an oil supply arrangement according to the invention FIG. 3 shows a cut view of an oil pump used in the oil supply arrangement according to the invention.

DETAILED DESCRIPTION

The embodiments of aspects of the invention with further developments described in the following are to be regarded only as examples and are in no way to limit the scope of the protection provided by the patent claims.

Figure 1:
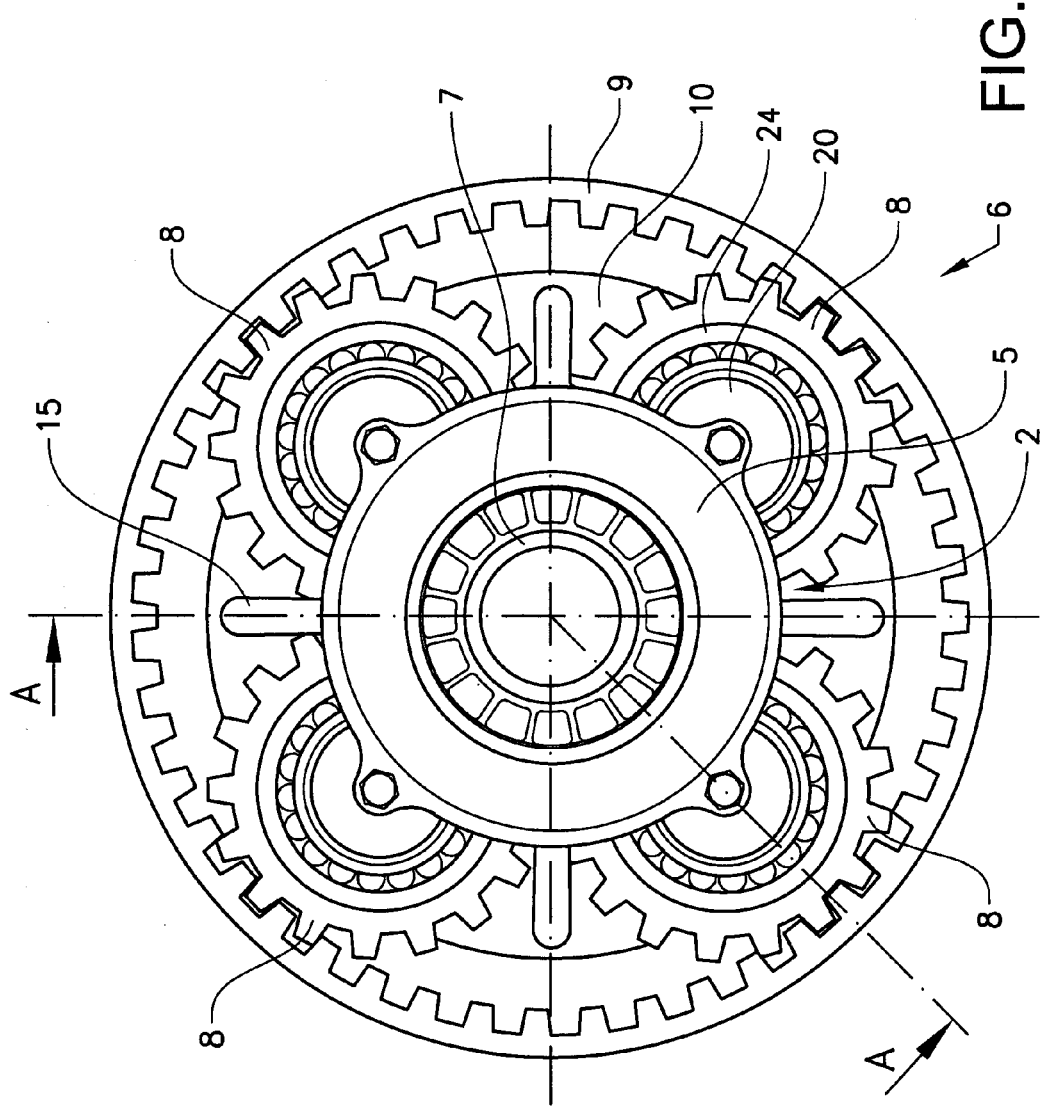
FIG. 1 shows a front view of an oil supply arrangement according to the invention.

FIG. 1 shows a front view of an oil supply arrangement according to an aspect of the invention mounted on a planetary gear on a vehicle. FIG. 2 shows a split side view of the oil supply arrangement along line A-A mounted in an axle arrangement which may be part of a wheel hub. FIG. 3 shows a split view of an oil pump.

The oil pump of the oil supply arrangement is mounted on a planetary gear used as a reduction gear on a vehicle. The planetary gear is used on the vehicle to reduce the rotational speed of the incoming drive axle and at the same time to increase the rotational torque. A reduction gear of this type is often mounted in the wheel hub of a vehicle, especially on heavy vehicles used for construction, where high loads are carried at low speeds. Such construction vehicles comprise among others articulated haulers, wheel loaders, motor graders and excavators. These types of vehicles are often used in rough terrain, where a high driving torque but a low speed is of advantage. The highest allowed speed may also be restricted by road traffic regulations. It is therefore advantageous to use a reduction gear to reduce the rotational speed of the drive wheels of the vehicle, and most commonly the reduction gear is mounted in the wheel hub of the vehicle. Generally, it is of advantage to place a reduction gear as close to the end user component as possible in order to minimize the torque requirements on the rest of the components in the drive line.

At the same time, it is of advantage to use concealed brakes on these types of vehicles. Regular open brakes, both disc brakes and drum brakes, are not protected from environmental influences such as water and dirt. Such environmental influences both impair the brake capacity and lead to an excessive wear of the brake parts, both the brake disc and the brake lining. Regular brakes are also adapted to be at least partly cooled by an air flow created by the vehicle travelling at speed. Construction vehicles do not create any substantial air flow for the brakes due to their low travelling speed. For these reasons, oil cooled wet disc brakes enclosed within the wheel hub are often used on construction vehicles.

Normally, such a wet disc brake comprises a plurality of brake discs with brake linings in between. Each brake disc may be provided with brake linings on one side or brake lining discs may be arranged between the brake discs. The brake linings may be shaped as discs or as brake pads having different shapes. The brake discs and linings are pushed against each other by a brake piston of some kind, normally operated by a hydraulic, pressure, even though other types of actuating means are also possible to use. In a simple design, at least parts of the brake discs are immersed in oil contained in the wheel hub. For brakes on heavier vehicles, where the brake capacity requirements are higher, there may be a need to circulate the oil through the disc brake in order to improve the cooling of the brake. The oil is normally circulated by an external pump.

The wet disc brake is further preferably mounted on the wheel side of the reduction gear, i.e. after the reduction gear. In this way, the brake discs will rotate with the same speed as the wheels rotates, which is a relatively low speed and which often is close to zero for construction vehicles. There are several advantages of mounting the brake such that it rotates with the wheel speed. One advantage is that it is easier to control the brake power of a brake rotating with a lower speed. Thus, a wheel brake is easier to regulate which in turn provides a better drivability for the vehicle. This is of advantage especially for brake-by-wire systems. A further advantage of mounting the brake at the wheel side of the reduction gear is that it will still be possible to engage the brake in order to slow down the vehicle after a breakdown of the drive shaft or of the reduction gear.

It is also possible to mount a reduction gear to the propeller shaft, before the differential. Such a solution may be used on lighter vehicles where the driving torque is relatively low. In such a case, the wet disc brake may advantageously be mounted after the reduction gear but before the differential, such that the brake discs rotates with the outgoing, lower speed of the planetary gear.

In FIG. 1, the oil pump 2 of the oil supply arrangement 1 is shown in a front view mounted on a planetary gear 6. The planetary gear comprises a sun gear 7 which is connected to the incoming shall, in this example the drive shaft 11 of the vehicle. This constitutes the input of the planetary gear. The sun gear meshes with the planet gears 8 of the planetary gear, in this example four planet gears. The planet gears are suspended by bearings 24 held, by supports 20 fixedly attached to the planet gear carrier 10. The planet gears 8 further meshes with a ring gear or annulus 9 fixedly attached to the axle casing 12. In this way, the planet gear carrier 10 will constitute the output of the reduction gear. Thus, when the sun gear 7 is rotated by the drive shaft, the rotation of the planet gear carrier will be reduced by the gear ratio of the planetary gear, which is dependent on the relation between the number of teeth of the sun gear 7 and the ring gear 9.

The oil pump 2 is mounted on the planetary gear 6. The oil pump 2 comprises a pump housing 3 which in the shown example is mounted to the planet gear supports 20. The impeller 4 of the oil pomp is positioned in the pump housing and is adapted to rotate with the speed of the drive shaft, i.e. with the input speed of the planetary gear. The impeller is thus mounted to the incoming, drive shaft, either directly to the drive shaft with teeth 25 as shown in the figure, or to the sun gear. A pump cover 5 closes the pump interior and provides an oil inlet 21. In the shown example, the oil inlet is an annular opening extending around the inner circumferential of the pump. The pump housing is further provided with oil conduits 15 which lead the oil from the oil pump to the oil inlets for the disc brake. The ends of the oil conduits form oil outlets 22 from the oil pump. The oil flow through the oil supply arrangement is shown with arrows in FIG. 2. In the shown example, the oil inlets of the disc brake are positioned in the planet gear carrier and each oil inlet comprise an oil distributor 23 which directs the oil to the spaces between the individual brake discs. In this way, a reliable distribution of oil to the brake discs is ensured, which in turn leads to an improved cooling of the individual brake discs. The oil distributor may supply the same amount of oil to the all separate brake discs or may e.g. supply more oil to the centre of the brake and less to the outer brake discs in order to optimize the heat distribution between the brake discs.

The disc brake 16 comprises at least one brake disc 17, 18. In the shown example, four rotating brake discs 17 are used. The brake discs 17 are mounted to the planet gear carrier 10 in a radially fixed manner but somewhat displaceable in the axial direction, e.g. by using splines. The same applies to the stationary brake discs 18, which are mounted in a radially fixed manner to the cover member 14, also somewhat displaceable in the axial direction. This allows the brake discs 17 and the brake discs 18 to be pushed together during a brake action.

The brake lining may be applied to one side of all brake discs 17, 18. It is also possible that the rotating brake discs are bare discs without any brake lining and to provide the stationary brake discs 18 with brake lining on both sides. The brake lining on a brake disc may be shaped as a continuous circular pad or may comprise several brake pads having appropriate shapes. It is also possible that the stationary brake discs are not circular but comprise several semi-circular brake pads. This will improve the serviceability of the brake pads when they need to be replaced. A piston 19 (schematically shown) is used to actuate the disc brake in a known manner. When the brake is in a released state, narrow gaps between the brake discs are created, through which the oil can flow. When a brake disc comprises several brake pads, oil can also flow in between the brake pads.

When the oil has passed the brake discs and the brake linings, the oil is returned to the inner of the axle casing. The oil may return directly to the inner of the axle casing through one or more holes. In the shown example, the oil is led through one or more oil channels 13 in the axle casing to a remote place of the axle casing, e.g. to the other end of the axle casing. In this way, the axle casing itself can be used as a cooling element to improve the cooling of the oil. The cooling surface for the oil is thus enlarged. In this way, the oil is distributed to a larger surface which helps to reduce the temperature of the oil.

Figure 4:
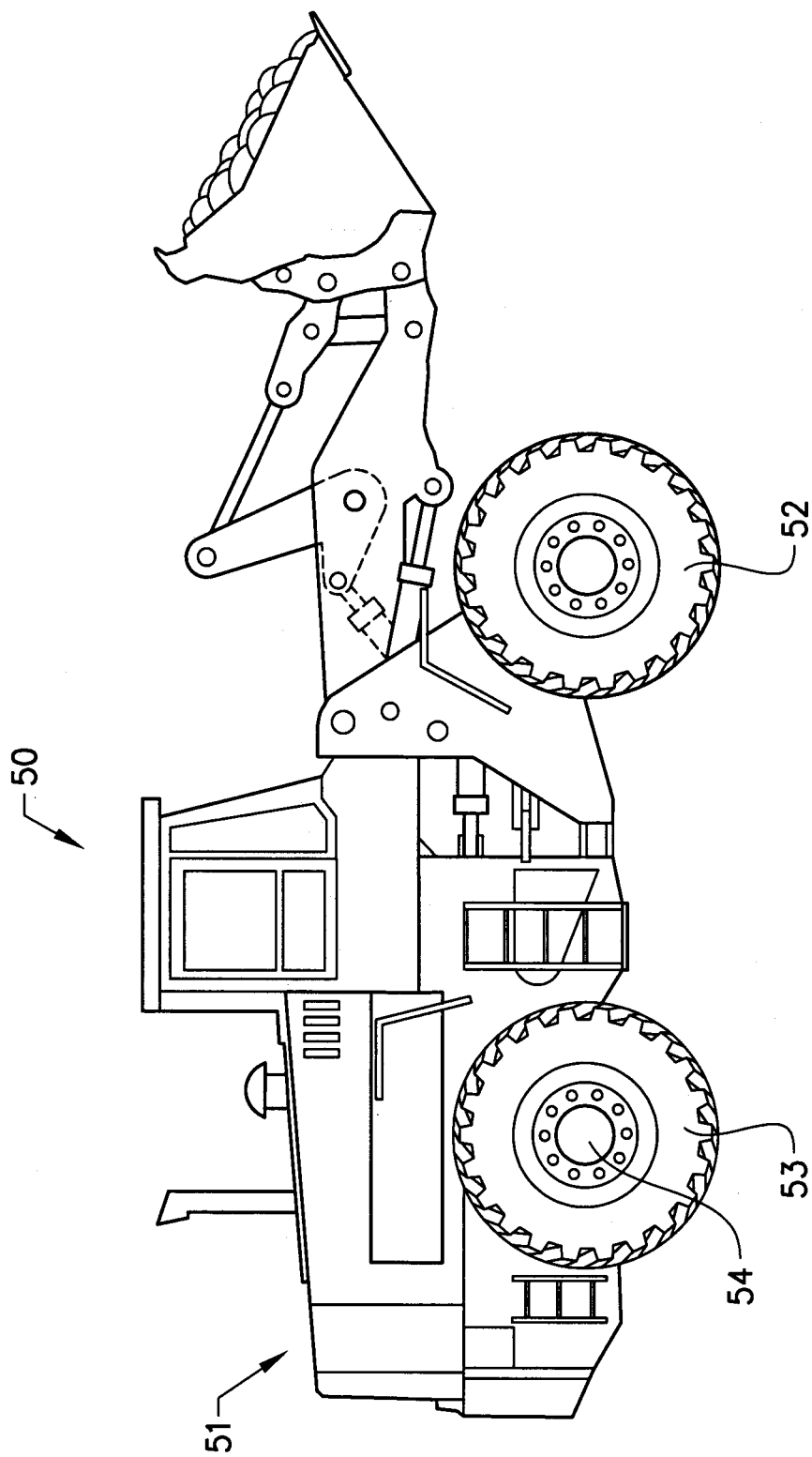
FIG. 4 shows a side view of a heavy vehicle comprising at least one oil supply arrangement according to the invention.

FIG. 4 shows an example of a heavy vehicle comprising at least one inventive oil supply arrangement. The shown vehicle is a wheel loader 50. The wheel loader comprises an engine compartment 51 having an engine connected to a drive line (not shown), which in turn drives at least the rear wheels 53 of the vehicle. On some vehicles, also the front wheels 52 are powered. The rear wheel 53 is mounted to the wheel hub 54 which comprises a planetary gear having, an oil supply arrangement according to an aspect of the invention.

The invention is not to be regarded as being limited to the embodiments described above, a number of additional variants and modifications being possible within the scope of the subsequent patent claims.

REFERENCE SIGNS

1. Oil supply arrangement
2: Oil pump
3: Pump housing
4: impeller
5: Pump cover
6: Planetary gear
7: Sun gear
8: Planet gear
9: Ring gear
10: Planet gear carrier
11: Drive shaft
12: Axle casing
13: Oil channel
14: Cover member
15: Oil conduit
16: Disc brake
17: Rotating brake disc
18: Stationary brake disc
19: Piston
20: Support
21: Oil inlet
22: Oil outlet
23: Oil distributor
24: Bearing
25: Teeth
50: Vehicle
51: Engine compartment
52: Front wheel
53: Rear wheel
54: Wheel hub

The invention claimed is:

1. An arrangement for supplying oil to a brake, the brake comprising one or more brake discs, the brake being arranged for braking an output shaft of a planetary gear where the planetary gear is a reduction gear, the arrangement comprising a rotatable impeller for supplying oil to the brake, wherein the impeller is comprised in a centrifugal oil pump and is arranged to be rotated by rotating an input shaft of the planetary gear, the centrifugal oil pump having a pump housing, the impeller being positioned in the pump housing and the brake discs being located outside the pump housing, where the input shaft of the planetary gear is arranged to drive a sun gear of the planetary gear and where the impeller is mounted to the sun gear.

2. Arrangement according to claim 1, wherein an input gear comprises a wheel drive shaft and the sun gear is mounted to the wheel drive shaft and the planetary gear is part of a wheel reduction hub.

3. Arrangement according to claim 1, wherein an input gear comprises a propeller drive shaft and the sun gear is mounted to the propeller drive shaft and the planetary gear is mounted before a differential in a rear axle.

4. Arrangement according to claim 1, wherein the planetary gear has a planet gear carrier.

5. Arrangement according to claim 4, wherein the arrangement comprises an oil distributor that is adapted to distribute oil to an individual brake and the oil distributor is integrated in the planet gear carrier.

6. Arrangement according to claim 4, wherein the brake is arranged for braking the planet gear carrier.

7. Arrangement according to claim 6, wherein a rotatable part of the brake is mounted to the planet gear carrier of the planetary gear.

8. Arrangement according to claim 4, wherein the arrangement comprises a pump cover mounted to the planet gear carrier.

9. Arrangement according to claim 8, wherein the pump cover comprises at least one oil conduit arranged for feeding oil to the brake.

10. Arrangement according to claim 1, wherein a stationary part of the brake is mounted to a housing of the planetary gear.

11. Arrangement according to claim 1, wherein the brake is a wet disc brake.

12. Arrangement according to claim 1, wherein the brake comprises a plurality of brake discs.

13. Arrangement according to claim 12, wherein the brake comprises a plurality of brake linings arranged to cooperate with the brake discs.

14. Arrangement according to claim 12, wherein the arrangement comprises an oil distributor that is adapted to distribute oil to individual brake discs.

15. An axle casing for a working machine, the working machine comprising an arrangement for supplying oil to a brake, the brake comprising one or more brake discs, the brake being arranged for braking an output shaft of a planetary gear where the planetary gear is a reduction gear, the arrangement comprising a rotatable impeller for supplying oil to the brake, wherein the impeller is comprised in a centrifugal oil pump and is arranged to be rotated by rotating an input shaft of the planetary gear, the centrifugal oil pump having a pump housing, the impeller being positioned in the pump housing and the brake discs being located outside the pump housing, where the input shaft of the planetary gear is arranged to drive a sun gear of the planetary gear and where the impeller is mounted to the sun gear, wherein the axle casing is provided with at least one channel in fluid communication with the brake for transportation of oil from the brake to an interior of the axle casing so as to enable circulation of oil through the brake from the arrangement.

16. A working machine comprising an arrangement for supplying oil to a brake, the brake comprising one or more brake discs, the brake being arranged for braking an output shaft of a planetary gear where the planetary, gear is a reduction gear, the arrangement comprising a rotatable impeller for supplying oil to the brake, wherein the impeller is comprised in a centrifugal oil pump and is arranged to be rotated by rotating an input shaft of the planetary gear, the centrifugal oil pump having a pump housing, the impeller being positioned in the pump housing and the brake discs being located outside the pump housing, where the input shaft of the planetary gear is arranged to drive a sun gear of the planetary gear and where the impeller is mounted to the sun gear.

* * * * *